United States Patent
Sugimoto

(10) Patent No.: US 11,554,770 B2
(45) Date of Patent: Jan. 17, 2023

(54) CONTROLLER AND CONTROL METHOD FOR HYBRID VEHICLE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/490,022

(22) Filed: Sep. 30, 2021

(65) Prior Publication Data
US 2022/0111827 A1    Apr. 14, 2022

(30) Foreign Application Priority Data
Oct. 8, 2020 (JP) .............................. JP2020-170270

(51) Int. Cl.
*B60W 20/10* (2016.01)
*F02D 41/22* (2006.01)
(Continued)

(52) U.S. Cl.
CPC ............... *B60W 20/10* (2013.01); *B60K 6/24* (2013.01); *B60W 10/06* (2013.01); *B60W 10/08* (2013.01); *B60W 50/0205* (2013.01); *F01N 13/008* (2013.01); *F02D 41/008* (2013.01); *F02D 41/1454* (2013.01); *F02D 41/22* (2013.01); *B60K 6/26* (2013.01); *B60W 2510/0638* (2013.01); *B60W 2510/0657* (2013.01); *B60W 2510/081* (2013.01); *B60W 2710/06* (2013.01); *B60W 2710/0622* (2013.01);
(Continued)

(58) Field of Classification Search
CPC ...... B60W 20/10; B60W 10/06; B60W 10/08; B60W 50/0205; B60K 6/24; B60K 6/26; F02N 13/008
See application file for complete search history.

(56) References Cited

U.S. PATENT DOCUMENTS

2003/0102175 A1* 6/2003 Wakashiro ............ F02D 41/123
903/918
2009/0306846 A1* 12/2009 Jeong ...................... F02D 41/22
702/183

(Continued)

FOREIGN PATENT DOCUMENTS

JP          2001-207886 A    8/2001

*Primary Examiner* — George C Jin
(74) *Attorney, Agent, or Firm* — Oblon, McClelland, Maier & Neustadt, L.L.P.

(57) ABSTRACT

A controller for a hybrid vehicle controls an electric motor such that a motor torque is input to a crankshaft in order to compensate for a decrease in an engine torque when a cylinder deactivation control is executed, the decrease resulting from suspension of combustion in one or some of cylinders. The controller calculates an engine torque calculated value using an engine rotation speed, a motor rotation speed, and the motor torque. The controller diagnoses that the cylinder deactivation control is functioning normally when the engine torque calculated value is less than a torque determination value and diagnose that the cylinder deactivation control is not functioning normally when the engine torque calculated value is not less than the torque determination value during the execution of the cylinder deactivation control.

4 Claims, 5 Drawing Sheets

(51) Int. Cl.
  *B60W 10/06*  (2006.01)
  *B60W 10/08*  (2006.01)
  *B60K 6/24*  (2007.10)
  *F02D 41/00*  (2006.01)
  *F01N 13/00*  (2010.01)
  *F02D 41/14*  (2006.01)
  *B60W 50/02*  (2012.01)
  *B60K 6/26*  (2007.10)

(52) U.S. Cl.
  CPC .... *B60W 2710/083* (2013.01); *B60Y 2200/92* (2013.01); *F02D 2200/04* (2013.01); *F02D 2200/101* (2013.01)

(56) References Cited

U.S. PATENT DOCUMENTS

2018/0142636 A1* 5/2018 Brennan .............. F02D 41/0087
2019/0360413 A1* 11/2019 Uhrich ................ F02D 41/0005
2020/0309051 A1* 10/2020 Kelly .................. F02D 41/1497
2022/0111827 A1* 4/2022 Sugimoto .............. B60K 6/445

* cited by examiner

CONTROLLER AND CONTROL METHOD FOR HYBRID VEHICLE

BACKGROUND

1. Field

The present disclosure relates to a controller and a control method for a hybrid vehicle.

2. Description of Related Art

Japanese Laid-Open Patent Publication No. 2001-207886 discloses an example of a hybrid vehicle that includes an internal combustion engine and a travel motor as a power source. In such a hybrid vehicle, a cylinder deactivation control is executed to control the internal combustion engine such that combustion is suspended in one or some of cylinders in the internal combustion engine while combustion is not suspended in the remaining cylinders. In the execution period of the cylinder deactivation control, the suspension of combustion in one or some of the cylinders decreases an engine torque.

In the hybrid vehicle disclosed in the above-described document, during the execution of the cylinder deactivation control, the decrease in the engine torque due to the suspension of combustion in one or some of the cylinders is compensated for by driving the travel motor. This limits the generation of vibration and noise in the hybrid vehicle that are caused by the execution of the cylinder deactivation control.

When combustion is suspended in one or some of the cylinders by executing the cylinder deactivation control, it is desirable to diagnose whether the cylinder deactivation control is functioning normally.

Examples of the diagnosis include a method for monitoring the fluctuation of the rotation speed of the crankshaft during the execution of the cylinder deactivation control. However, when the decrease in the engine torque due to the suspension of combustion in one or some of the cylinders is compensated for by driving the travel motor, the fluctuation of the rotation speed of the crankshaft caused by the suspension of combustion in one or some of the cylinders is limited. As a result, even if the fluctuation of the rotation speed is monitored, whether the cylinder deactivation control is functioning normally is unable to be diagnosed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for a hybrid vehicle according to an aspect of the present disclosure is employed in a hybrid vehicle that includes an internal combustion engine with cylinders and a crankshaft and includes an electric motor coupled to the crankshaft. The controller includes processing circuitry configured to: execute a cylinder deactivation control to control the internal combustion engine such that combustion is suspended in one or some of the cylinders while combustion is not suspended in the remaining ones of the cylinders; control the electric motor such that a motor torque is input to the crankshaft in order to compensate for a decrease in an output torque of the internal combustion engine when the cylinder deactivation control is executed, the motor torque being torque of the electric motor, the decrease resulting from the suspension of the combustion in the one or some of the cylinders; calculate an engine torque calculated value using an engine rotation speed, a motor rotation speed, and the motor torque, the engine torque calculated value being a calculated value of the output torque of the internal combustion engine, the engine rotation speed being a rotation speed of the crankshaft, the motor rotation speed being a rotation speed of the electric motor; diagnose that the cylinder deactivation control is functioning normally when the engine torque calculated value is less than a torque determination value during the execution of the cylinder deactivation control; and diagnose that the cylinder deactivation control is not functioning normally when the engine torque calculated value is not less than the torque determination value during the execution of the cylinder deactivation control.

When the electric motor is coupled to the crankshaft of the internal combustion engine, the engine torque, which is the output torque of the internal combustion engine, is transmitted to the electric motor. Thus, the engine rotation speed and the motor rotation speed are needed to obtain the engine torque through calculation. Further, when the motor torque is input to the crankshaft by driving the electric motor, the engine rotation speed and the motor rotation speed are affected not only by the engine torque but also by the motor torque.

The above-described configuration calculates the engine torque calculated value using the engine rotation speed, the motor rotation speed, and the motor torque. When the engine torque calculated value is not less than the torque determination value during the execution of the cylinder deactivation control, it is determined that the engine torque has not decreased or the decrease amount of the engine torque is excessively small even if the cylinder deactivation control is executed. Thus, in such a case, it is diagnosed that the cylinder deactivation control is not functioning normally. In contrast, when the engine torque calculated value is less than the torque determination value, the engine torque is determined as having decreased sufficiently by the execution of the cylinder deactivation control. Thus, in such a case, the cylinder deactivation control is diagnosed as functioning normally.

Accordingly, in the above-described configuration, even when the electric motor is driven during the execution of the torque compensation control, a diagnosis is made as to whether the cylinder deactivation control is functioning normally.

When the motor torque is not input to the crankshaft during the execution of the cylinder deactivation control, the output torque of the internal combustion engine decreases due to the suspension of the combustion in the one or some of the cylinders. The decrease amount of the output torque changes depending on the intake air amount and the engine rotation speed at the moment. Thus, the torque determination value may be set in correspondence with at least one of the intake air amount of the internal combustion engine and the engine rotation speed.

In the above-described configuration, the torque determination value is set in correspondence with at least one of the intake air amount and the engine rotation speed at the moment. Using such a torque determination value for the above-described diagnosis increases the diagnosis accuracy.

The internal combustion engine according to an aspect includes: a catalyst arranged in an exhaust passage; and an air-fuel ratio sensor arranged downstream of the catalyst in the exhaust passage. When an air-fuel ratio detected by the air-fuel ratio sensor is a richer value than a stoichiometric air-fuel ratio, the oxygen absorption amount of the catalyst is predicted to decrease.

Thus, the cylinder deactivation control may be executed when the air-fuel ratio detected by the air-fuel ratio sensor indicates the richer value than a stoichiometric air-fuel ratio. In this case, the cylinder deactivation control may include suspending supply of fuel into the one or some of the cylinders. This causes air to flow from the one or some of the cylinders to the exhaust passage so that the air is supplied to the catalyst. As a result, the oxygen absorption amount of the catalyst increases. Consequently, the absorption amount detected by the air-fuel ratio sensor approaches the stoichiometric air-fuel ratio.

A control method for a hybrid vehicle according to an aspect of the present disclosure is employed in a hybrid vehicle that includes an internal combustion engine with cylinders and a crankshaft and includes an electric motor coupled to the crankshaft. The control method includes: executing a cylinder deactivation control to control the internal combustion engine such that combustion is suspended in one or some of the cylinders while combustion is not suspended in the remaining ones of the cylinders; controlling the electric motor such that a motor torque is input to the crankshaft in order to compensate for a decrease in an output torque of the internal combustion engine when the cylinder deactivation control is executed, the motor torque being torque of the electric motor, the decrease resulting from the suspension of the combustion in the one or some of the cylinders; calculating an engine torque calculated value using an engine rotation speed, a motor rotation speed, and the motor torque, the engine torque calculated value being a calculated value of the output torque of the internal combustion engine, the engine rotation speed being a rotation speed of the crankshaft, the motor rotation speed being a rotation speed of the electric motor; diagnosing that the cylinder deactivation control is functioning normally when the engine torque calculated value is less than a torque determination value during the execution of the cylinder deactivation control; and diagnosing that the cylinder deactivation control is not functioning normally when the engine torque calculated value is not less than the torque determination value during the execution of the cylinder deactivation control.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 100 for a hybrid vehicle 500 according to an embodiment will now be described with reference to FIGS. 1 to 5.

Figure 1:
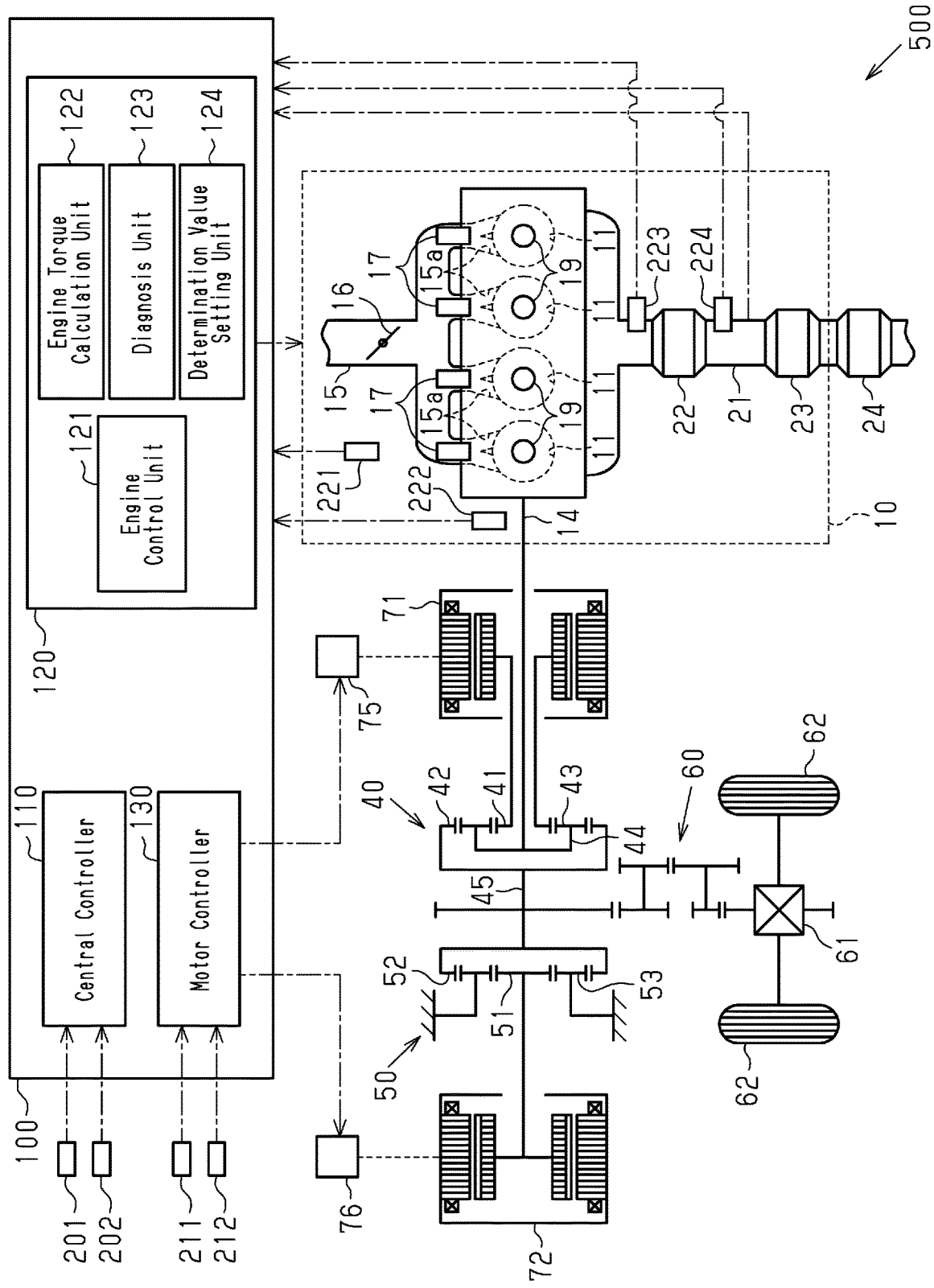
FIG. 1 is a diagram showing the schematic configuration of a hybrid vehicle according to an embodiment and showing the functional configuration of a controller included in the hybrid vehicle.

FIG. 1 shows an example of the hybrid vehicle 500 including the controller 100 of the present embodiment. In the present embodiment, the hybrid vehicle 500 is simply referred to as the vehicle 500.

The vehicle 500 includes an internal combustion engine 10, a power distribution-integration mechanism 40, and a first motor generator 71. The power distribution-integration mechanism 40 is connected to a crankshaft 14 of the internal combustion engine 10. The first motor generator 71 is connected to the power distribution-integration mechanism 40. A second motor generator 72 is coupled to the power distribution-integration mechanism 40 via a reduction gear 50. Further, driven wheels 62 are coupled to the power distribution-integration mechanism 40 via a deceleration mechanism 60 and a differential 61.

The power distribution-integration mechanism 40 is a planetary gear mechanism. That is, the power distribution-integration mechanism 40 includes a sun gear 41, which is an external gear, and a ring gear 42, which is an internal gear. Pinion gears 43 that mesh with the sun gear 41 and the ring gear 42 are arranged between the sun gear 41 and the ring gear 42. The pinion gears 43 are supported by a carrier 44 such that the pinion gears 43 can rotate and can orbit around the sun gear 41. The first motor generator 71 is coupled to the sun gear 41. The crankshaft 14 is coupled to the carrier 44. A ring gear shaft 45 is connected to the ring gear 42. The reduction gear 50 and the deceleration mechanism 60 are coupled to the ring gear shaft 45.

The reduction gear 50 is a planetary gear mechanism. That is, the reduction gear 50 includes a sun gear 51, which is an external gear, and a ring gear 52, which is an internal gear. The second motor generator 72 is coupled to the sun gear 51. The ring gear shaft 45 is connected to the ring gear 52. Pinion gears 53 that mesh with the sun gear 51 and the ring gear 52 are arranged between the sun gear 51 and the ring gear 52. The pinion gears 53 are supported such that the pinion gears 53 can rotate and cannot orbit around the sun gear 51.

The first motor generator 71 exchanges electric power with a battery via a first inverter 75. The second motor generator 72 exchanges electric power with the battery via a second inverter 76.

When an engine torque TQe (an output torque of the internal combustion engine 10) is input to the carrier 44 of the power distribution-integration mechanism 40, the engine torque TQe is distributed to the sun gear 41 and the ring gear 42. As described above, the first motor generator 71 is coupled to the crankshaft 14 via the power distribution-integration mechanism 40. Thus, the first motor generator 71 is rotated by the engine torque TQe distributed to the sun gear 41. In this case, the first motor generator 71 functions as a power generator.

When the first motor generator 71 functions as an electric motor, a first motor torque TQmg1 (an output torque of the first motor generator 71) is input to the sun gear 41. The torque of the first motor torque TQmg1 input to the sun gear 41 is distributed to the carrier 44 and the ring gear 42. When the first motor torque TQmg1 is input to the crankshaft 14 via the carrier 44, the crankshaft 14 is rotated.

The engine torque TQe of the internal combustion engine 10 distributed to the ring gear 42 is input to the driven wheels 62 via the ring gear shaft 45, the deceleration mechanism 60, and the differential 61. Likewise, the first motor torque TQmg1 of the first motor generator 71 is input to the driven wheels 62 via the ring gear shaft 45, the deceleration mechanism 60, and the differential 61.

In the deceleration of the vehicle 500, when the second motor generator 72 functions as a power generator, a regenerative braking force corresponding to the second motor generator 72 is produced in the vehicle 500. When the second motor generator 72 functions as an electric motor, a second motor torque TQmg2 (an output torque of the second motor generator 72) is input to the driven wheels 62 via the reduction gear 50, the ring gear shaft 45, the deceleration mechanism 60, and the differential 61.

The internal combustion engine 10 includes cylinders 11. In each cylinder 11, a piston reciprocates. Each piston is coupled to the crankshaft 14 by a connecting rod.

The internal combustion engine 10 includes an intake passage 15 that includes a throttle valve 16. The throttle valve 16 regulates an intake amount, that is, the flow rate of intake air flowing through the intake passage 15. In the internal combustion engine 10, each cylinder includes a fuel injection valve 17 and an ignition device 19. Each fuel injection valve 17 injects fuel to the corresponding intake port 15a. Each ignition device 19 ignites air-fuel mixture containing fuel and intake through spark discharge. Exhaust gas generated through the combustion of air-fuel mixture in each cylinder 11 is discharged to an exhaust passage 21. The exhaust passage 21 includes a three-way catalyst 22. At the downstream side of the three-way catalyst 22 in the exhaust passage 21, a filter 23 is provided to trap particulate matter contained in exhaust gas. At the downstream side of the filter 23 in the exhaust passage 21, a downstream catalyst 24 is provided. The downstream catalyst 24 is similar to the three-way catalyst 22.

The controller 100 (processing circuitry) includes a central controller 110, an engine controller 120, and a motor controller 130. The central controller 110 centrally controls the vehicle 500. The engine controller 120 controls the internal combustion engine 10. The motor controller 130 controls the first motor generator 71 and the second motor generator 72. In the present embodiment, the motor controller 130 corresponds to a motor control unit.

Each of the central controller 110, the engine controller 120, and the motor controller 130 simply needs to have any one of the following configurations (a) to (c).

(a) Circuitry including one or more processors that execute various processes in accordance with a computer program The processor includes a CPU and a memory, such as a RAM and a ROM. The memory stores program codes or instructions configured to cause the CPU to execute the processes. The memory, or computer readable medium, includes any type of medium that is accessible by general-purpose computers and dedicated computers.

(b) Circuitry including one or more dedicated hardware circuits that execute various processes The dedicated hardware circuits include, for example, an application specific integrate circuit (ASIC) and a field programmable gate array (FPGA).

(c) Circuitry including a processor that executes part of various processes in accordance with a computer program and a dedicated hardware circuit that executes the remaining processes The central controller 110 receives detection signals from various sensors, such as an accelerator pedal sensor 201 and a vehicle speed sensor 202. The accelerator pedal sensor 201 detects an accelerator operation amount ACP and outputs a detection signal corresponding to the detection result. The accelerator operation amount ACP is the operation amount of the accelerator pedal by the driver of the vehicle 500. The vehicle speed sensor 202 detects a vehicle speed SP and outputs a detection signal corresponding to the detection result. The vehicle speed SP is the travel speed of the vehicle 500.

The central controller 110 uses the accelerator operation amount ACP and the vehicle speed SP to obtain a vehicle requested power. The vehicle requested power is a requested value of the driving force of the vehicle 500. Further, the central controller 110 uses, for example, the vehicle requested power to obtain an engine requested torque, a first motor requested torque, and a second motor requested torque. The engine requested torque is a requested value of the engine torque TQe. The first motor requested torque is a requested value of the first motor torque TQmg1. The second motor requested torque is a requested value of the second motor torque TQmg2.

The motor controller 130 receives detection signals from a first motor rotation angle sensor 211 and a second motor rotation angle sensor 212. The first motor rotation angle sensor 211 outputs a detection signal that corresponds to a first motor rotation speed Nmg1. The first motor rotation speed Nmg1 is the rotation speed of the rotor of the first motor generator 71. The second motor rotation angle sensor 212 outputs a detection signal that corresponds to a second motor rotation speed Nmg2. The second motor rotation speed Nmg2 is the rotation speed of the rotor of the second motor generator 72.

The motor controller 130 activates the first inverter 75 to control the first motor generator 71. That is, the motor controller 130 uses the first motor requested torque to activate the first inverter 75. This allows the first motor torque TQmg1 to be almost equal to the first motor requested torque. Likewise, the motor controller 130 activates the second inverter 76 to control the second motor generator 72. That is, the motor controller 130 uses the second motor requested torque to activate the second inverter 76. This allows the second motor torque TQmg2 to be almost equal to the second motor requested torque.

The engine controller 120 receives detection signals from various sensors installed in the internal combustion engine 10. The sensors installed in the internal combustion engine 10 include an air flow meter 221, a crank angle sensor 222, a first air-fuel ratio sensor 223, and a second air-fuel ratio sensor 224. The air flow meter 221 detects an intake air amount GA and outputs the detection result as a detection signal. The crank angle sensor 222 outputs a detection signal corresponding to an engine rotation speed NE. The engine rotation speed NE is the rotation speed of the crankshaft 14. The first air-fuel ratio sensor 223 detects a first air-fuel ratio Afu by detecting the oxygen concentration in exhaust gas flowing through a portion upstream of the three-way catalyst 22 in the exhaust passage 21, and outputs the detection result as a detection signal. The second air-fuel ratio sensor 224 detects a second air-fuel ratio Afd by detecting the oxygen concentration in exhaust gas flowing through a portion between the three-way catalyst 22 and the filter 23 in the exhaust passage 21, and outputs the detection result as a detection signal. In the present embodiment, the second air-fuel ratio sensor 224 corresponds to an air-fuel ratio sensor located downstream of the three-way catalyst 22 in the exhaust passage 21. The first air-fuel ratio sensor 223 corresponds to an air-fuel ratio sensor located upstream of the three-way catalyst 22 in the exhaust passage 21.

The engine controller 120 uses the detection signals from the sensors 221 to 224 and uses the engine requested torque to control the running of the internal combustion engine 10. This allows the engine torque TQe to be almost equal to the engine requested torque.

The engine controller 120 includes an engine control unit 121, an engine torque calculation unit 122, a diagnosis unit 123, and a determination value setting unit 124. These units are functional units that control the running of the internal combustion engine 10.

The engine control unit 121 controls various actuators included in the internal combustion engine 10. That is, the engine control unit 121 controls, for example, a throttle open degree SL and a fuel injection amount Qf of each fuel injection valve 17. The throttle open degree SL is the open degree of the throttle valve 16.

The engine control unit 121 uses the engine requested torque, the intake air amount GA, and the engine rotation speed NE to obtain a fuel injection amount reference value. The fuel injection amount reference value is a reference value of the fuel injection amount Qf. Further, the engine control unit 121 obtains a correction amount of the fuel injection amount through feedback control in which the difference between the first air-fuel ratio Afu and an air-fuel ratio target value AfTr is used as an input. The air-fuel ratio target value AfTr is a target value of the air-fuel ratio. The air-fuel ratio target value AfTr is set to, for example, a stoichiometric air-fuel ratio. The engine control unit 121 sets a requested fuel injection amount to the sum of the fuel injection amount reference value and the correction amount of the fuel injection amount or to a value corresponding to that sum. Then, the engine control unit 121 uses the requested fuel injection amount to control each fuel injection valve 17.

When feedback control is performed to adjust the air-fuel ratio in the above-described manner, the second air-fuel ratio Afd may have a richer value than the stoichiometric air-fuel ratio. This may result from a decrease in the oxygen absorption amount in the three-way catalyst 22.

When the second air-fuel ratio Afd indicates a richer value than the stoichiometric air-fuel ratio, the engine control unit 121 executes a cylinder deactivation control. In the cylinder deactivation control, the engine control unit 121 controls the internal combustion engine 10 such that combustion is suspended in one or some of the cylinders 11 while combustion is not suspended in the remaining cylinders 11. In the cylinder deactivation control of the present embodiment, the internal combustion engine 10 is controlled such that combustion is suspended in one of the cylinders 11 while combustion is not suspended in the remaining cylinders 11. The cylinder in which combustion is suspended in the cylinder deactivation control is referred to as the deactivated cylinder. The cylinder deactivation control suspends the supply of fuel into the deactivated cylinder.

Figure 2:
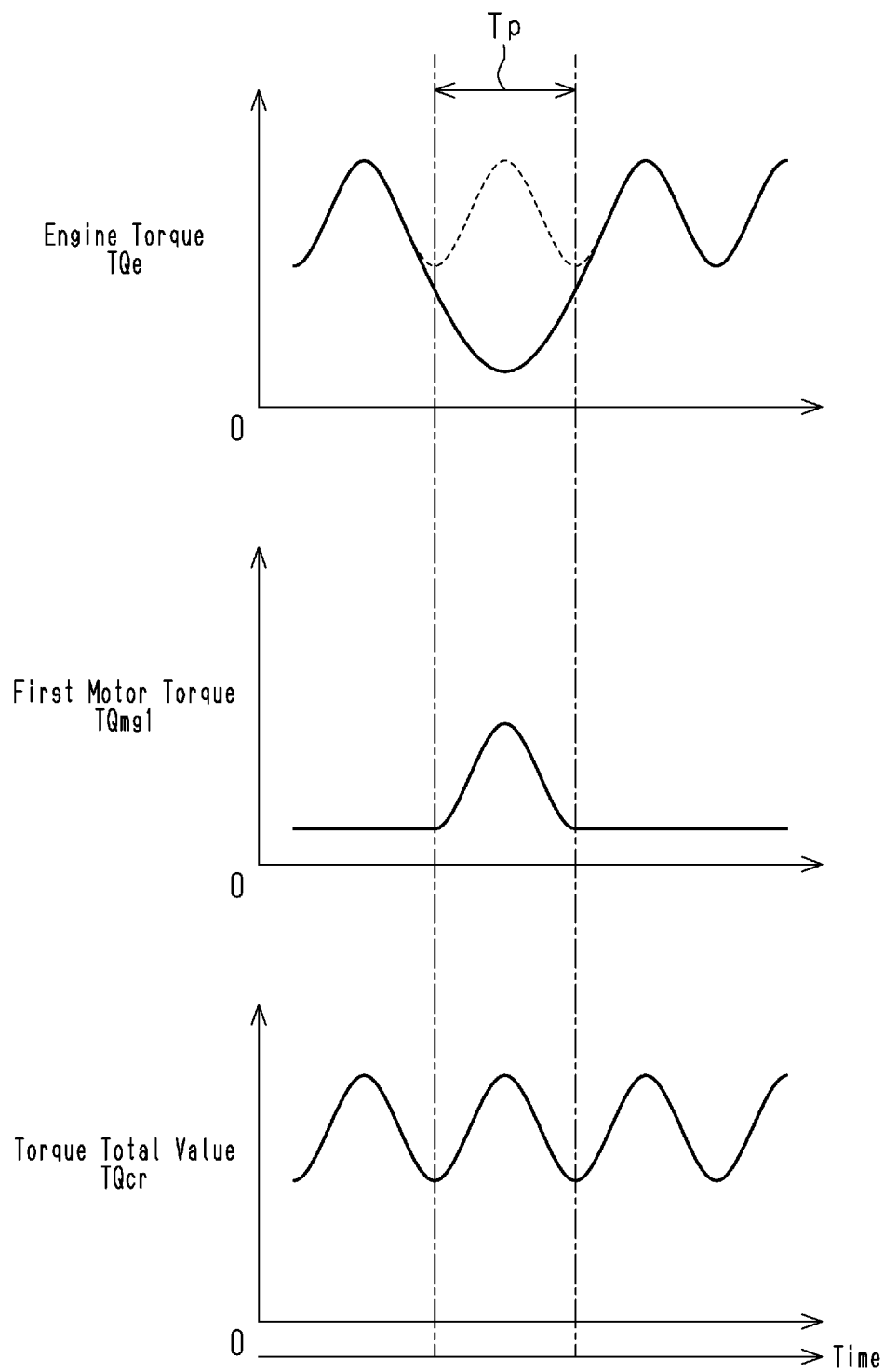
FIG. 2 is a timing diagram showing changes in torque in a case where the cylinder deactivation control is executed.

FIG. 2 shows changes in the engine torque TQe in a case where the engine requested torque is constant. When an engine deactivation control is not executed, the engine torque TQe fluctuates in a cycle corresponding to the engine rotation speed NE as shown by the broken line in FIG. 2. When the engine deactivation control is executed, the engine torque TQe changes as shown by the solid line in FIG. 2. That is, the engine torque TQe decreases sharply in a period when the deactivated cylinder enters the combustion stroke.

The engine torque calculation unit 122 calculates an engine torque calculated value TQeC. The engine torque calculated value TQeC is a calculated value of the engine torque TQe. The engine torque calculation unit 122 calculates the engine torque calculated value TQeC using the engine rotation speed NE, the first motor rotation speed Nmg1, and the first motor torque TQmg1. The details will be described later.

The diagnosis unit 123 diagnoses whether the cylinder deactivation control is functioning normally during the execution of the cylinder deactivation control. In the present embodiment, the diagnosis unit 123 diagnoses that the cylinder deactivation control is functioning normally when the engine torque calculated value TQeC is less than a torque determination value TQeTh during the execution of the cylinder deactivation control. In contrast, the diagnosis unit 123 does not diagnose that the cylinder deactivation control is functioning normally, that is, diagnoses that the cylinder deactivation control is not functioning normally when the engine torque calculated value TQeC is not less than the torque determination value TqeTh during the execution of the cylinder deactivation control.

The determination value setting unit 124 sets the torque determination value TQeTh. In the present embodiment, the determination value setting unit 124 sets the torque determination value TQeTh in correspondence with the intake air amount GA and the engine rotation speed NE. The process that sets the torque determination value TQeTh will be described in detail later.

A process routine executed by the motor controller 130 during the execution of the cylinder deactivation control will be described with reference to FIGS. 2 and 3. The processing routine shown in FIG. 3 is repeatedly executed when the engine is operated.

Figure 3:
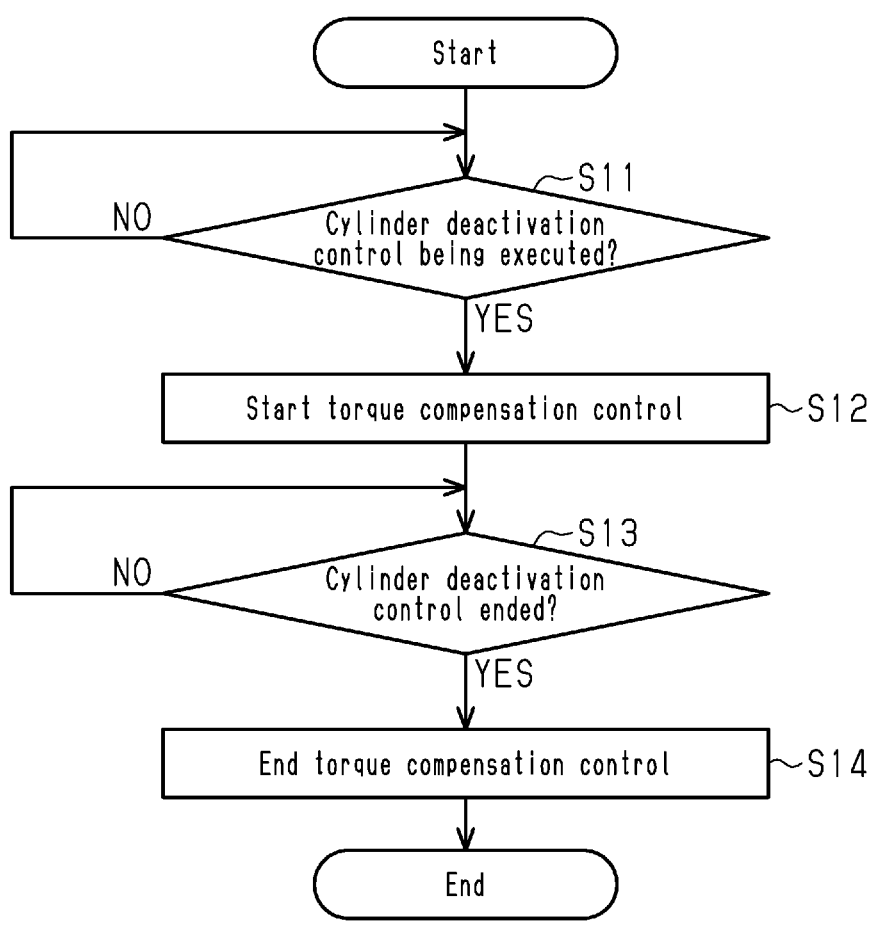
FIG. 3 is a flowchart illustrating a processing routine executed by the motor controller of the controller in FIG. 1.

In the processing routine shown in FIG. 3, in the first step S11, the motor controller 130 determines whether the engine control unit 121 is executing the cylinder deactivation control. When the engine control unit 121 is not executing the cylinder deactivation control (S11: NO), the motor controller 130 repeatedly executes the determination of S11 until the engine control unit 121 starts executing the cylinder deactivation control. When the engine control unit 121 is executing the cylinder deactivation control (S11: YES), the motor controller 130 advances the process to step S12.

In step S12, the motor controller 130 starts a torque compensation control. In the torque compensation control, the first motor generator 71 is controlled such that the crankshaft 14 receives the first motor torque TQmg1, thereby compensating for a decrease in the engine torque TQe caused by suspending combustion in the deactivated cylinder.

The torque compensation control will be described in detail with reference to FIG. 2. The motor controller 130 controls the first motor generator 71 so as to increase the first motor torque TQmg1 during a deactivation period Tp in which the engine torque TQe decreases sharply. Thus, the first motor torque TQmg1 input to the crankshaft 14 is larger during the deactivation period Tp than during a period other than the deactivation period Tp. As a result, the sum of the engine torque TQe input to the crankshaft 14 and the first motor torque TQmg1 input to the crankshaft 14, i.e., a torque total value TQcr changes as shown in FIG. 2. This limits a decrease in the torque total value TQcr during the deactivation period Tp even when the engine torque TQe decreases sharply during the deactivation period Tp.

Referring back to FIG. 3, when the torque compensation control is started in step S12, the motor controller 130 advances the process to step S13. In step S13, the motor controller 130 determines whether the engine control unit 121 has ended the execution of the cylinder deactivation control. When the engine control unit 121 has not ended the execution of the cylinder deactivation control (S13: NO), the motor controller 130 repeatedly executes the determination of S13 until the engine control unit 121 ends the execution of the cylinder deactivation control. That is, the motor controller 130 continues the execution of the torque compensation control. When the engine control unit 121 has ended the execution of the cylinder deactivation control (S13: YES), the motor controller 130 advances the process to step S14.

In step S14, the motor controller 130 ends the torque compensation control. Then, the motor controller 130 temporarily ends the processing routine.

Figure 4:
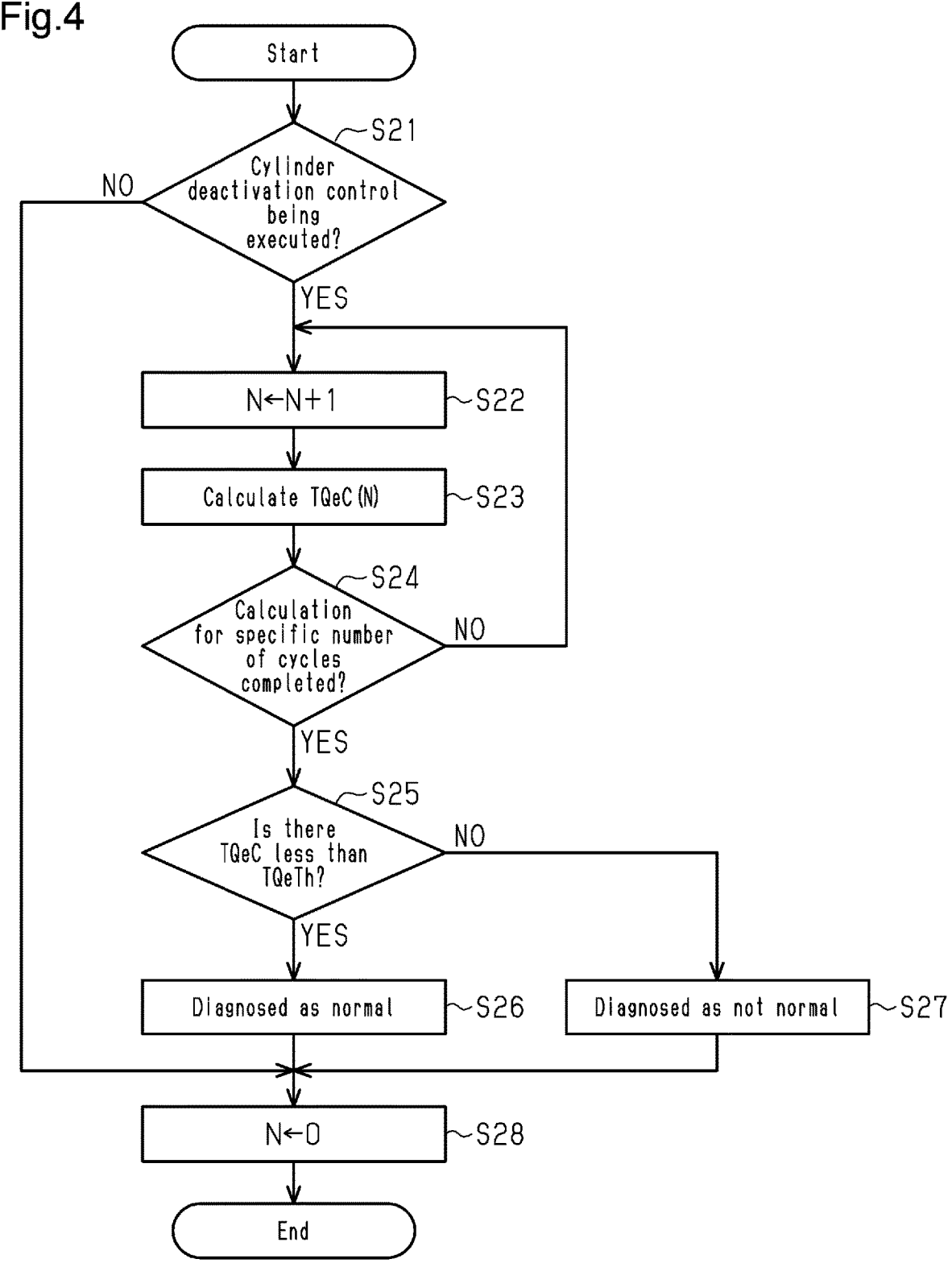
FIG. 4 is a flowchart illustrating a processing routine executed by the engine controller of the controller in FIG. 1.

A process routine executed by the engine controller 120 during the execution of the cylinder deactivation control will be described with reference to FIG. 4. The processing routine is repeatedly executed when the engine is operated.

In this processing routine, in the first step S21, the engine controller 120 determines whether the engine control unit 121 is executing the cylinder deactivation control. When the engine control unit 121 is not executing the cylinder deactivation control (S21: NO), the engine controller 120 advances the process to step S28. When the engine control unit 121 is executing the cylinder deactivation control (S21: YES), the engine controller 120 advances the process to the subsequent step S22. In step S22, the engine controller 120 increments coefficient N by 1.

Subsequently, in step S23, the engine torque calculation unit 122 of the engine controller 120 calculates an engine torque calculated value TQeC(N). The engine torque calculation unit 122 calculates, as the engine torque calculated value TQeC(N), the engine torque calculated value TQeC that is based on the latest value of the engine rotation speed NE, the latest value of the first motor rotation speed Nmg1, and the latest value of the first motor torque TQmg1. For example, the engine torque calculation unit 122 uses the following relational equation to calculate the engine torque calculated value TQeC.

$$TQeC = Ie \cdot \frac{d\omega e}{dt} + \frac{(1+\rho)}{\rho} \cdot \left( Ig \cdot \frac{d\omega g}{dt} - Tmg1 \right)$$

In this relational equation, Ie represents the inertia moment of the internal combustion engine 10, and Ig represents the inertia moment of the first motor generator 71. The inertia moments Ie, Ig are fixed values that have been defined by various parameters of the vehicle 500. Further, we represents a crank angle speed, and ωg represents a rotation angle speed of the rotor of the first motor generator 71. The engine rotation speed NE simply needs to be substituted into the crank angle speed ωe, and the first motor rotation speed Nmg1 simply needs to be substituted into the rotation angle speed ωg of the first motor generator 71. Furthermore, ρ represents a planetary gear ratio of the power distribution-integration mechanism 40, which connects the crankshaft 14 to the first motor generator 71. The planetary gear ratio of the power distribution-integration mechanism 40 is the ratio of the number of teeth of the ring gear 42 to the number of teeth of the sun gear 41. The first motor requested torque may be substituted into the first motor torque TQmg1. Alternatively, the calculated value of the motor torque calculated in reference to the current flowing through the first motor generator 71 may be substituted into the first motor torque TQmg1.

Using the above-described relational equation, the value obtained by removing a component of the first motor torque TQmg1 from the torque input to the crankshaft 14 is calculated as the engine torque calculated value TQeC.

When the engine torque calculated value TQeC(N) is calculated, the engine controller 120 advances the process to step S24. In step S24, the engine controller 120 determines whether the calculation of the engine torque calculated value TQeC for the specific number of cycles of the internal combustion engine 10 is completed. The specific number of cycles is set to the number of cycles greater than or equal to one cycle. When the calculation of the engine torque calculated value TQeC for the specific number of cycles of the internal combustion engine 10 is not completed yet (S24: NO), the engine controller 120 returns the process to step S22. That is, the calculation of the engine torque calculated value TQeC is continued. When the calculation of the engine torque calculated value TQeC for the specific number of cycles of the internal combustion engine 10 is completed (S24: YES), the engine controller 120 advances the process to step S25.

In step S25, the diagnosis unit 123 of the engine controller 120 determines whether the calculated multiple engine torque calculated values TQeC(1), TQeC(2), ..., TQeC(N) include an engine torque calculated value TQeC that is less than the torque determination value TQeTh. When the engine torque calculated values TQeC(1), TQeC(2), ..., TQeC(N) include the engine torque calculated value TQeC that is less than the torque determination value TQeTh (S25: YES), the engine controller 120 advances the process to step S26. In step S26, the diagnosis unit 123 of the engine controller 120 diagnoses that the cylinder deactivation control is functioning normally. Then, the engine controller 120 advances the process to step S28.

When the engine torque calculated values TQeC(1), TQeC(2), ..., TQeC(N) do not include the engine torque calculated value TQeC that is less than the torque determination value TQeTh (S25: NO), the engine controller 120 advances the process to step S27. In step S27, the diagnosis unit 123 of the engine controller 120 diagnoses that the cylinder deactivation control is not functioning normally. Then, the engine controller 120 advances the process to step S28.

In step S28, the engine controller 120 resets coefficient N to 0. Then, the engine controller 120 temporarily ends the processing routine.

The process that sets the torque determination value TQeTh will now be described in detail.

The amount of the engine torque TQe decreased when the cylinder deactivation control is functioning normally is affected by a friction torque of the internal combustion engine 10. The friction torque acts in a direction in which the rotation of the crankshaft 14 is impeded. Thus, as the friction torque increases, the amount of the engine torque TQe decreased due to the suspension of combustion in the deactivated cylinder tends to increase. The amount of the engine torque TQe decreased due to the suspension of combustion in the deactivated cylinder corresponds to a decrease amount of the engine torque TQe in the deactivation period Tp.

The friction torque varies in correspondence with the engine rotation speed NE and the intake air amount GA. Thus, in the present embodiment, the determination value setting unit 124 of the engine controller 120 uses the intake air amount GA and the engine rotation speed NE to set the torque determination value TQeTh. That is, the determination value setting unit 124 sets the torque determination value TQeTh to be smaller when the friction torque predicted from the intake air amount GA and the engine rotation speed NE is large than when the friction torque predicted from the intake air amount GA and the engine rotation speed NE is small.

The operation and advantages of the present embodiment will now be described.

When the cylinder deactivation control is functioning normally, there is a period in which the engine torque TQe decreases sharply as shown in FIG. 2. In the present embodiment, the engine torque calculated value TQeC is calculated using the engine rotation speed NE, the first motor rotation speed Nmg1, and the first motor torque TQmg1. That is, the value obtained by removing the component of the first motor torque TQmg1 from the torque input to the crankshaft 14 is calculated as the engine torque calculated value TQeC.

Figure 5:
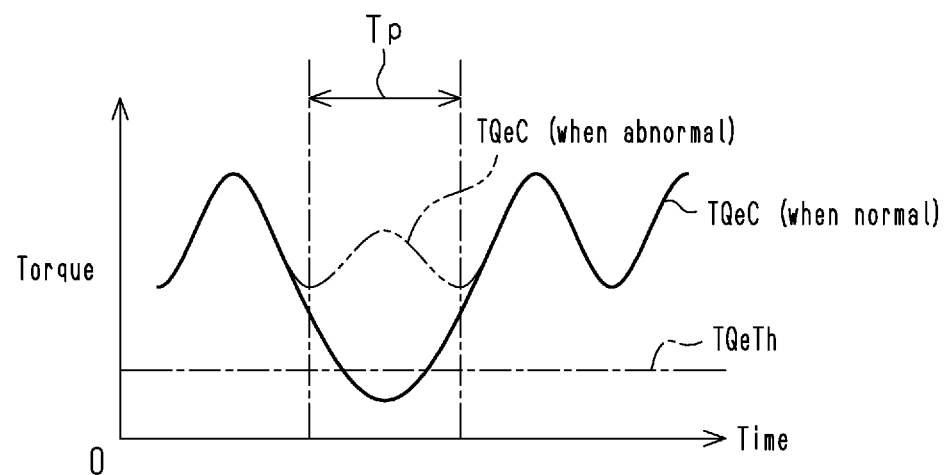
FIG. 5 is a timing diagram showing changes in the engine torque calculated value calculated by the engine torque calculation unit of the engine controller in FIG. 1.

As shown by the long dashed double-short dashed line in FIG. 5, when the engine torque calculated value TQeC is not less than the torque determination value TQeTh during the execution of the cylinder deactivation control, it is determined that the engine torque TQe has not decreased or that the decrease amount of the engine torque TQe is excessively small even if the cylinder deactivation control is executed. Thus, in such a case, it is diagnosed that the cylinder deactivation control is not functioning normally. As shown by the solid line in FIG. 5, when the engine torque calculated value TQeC is less than the torque determination value TQeTh, the engine torque TQe is determined as having decreased sufficiently by the execution of the cylinder deactivation control. Thus, in such a case, the cylinder deactivation control is diagnosed as functioning normally.

Accordingly, in the present embodiment, even when the first motor generator 71 is driven by executing the torque compensation control during the execution of the torque compensation control, a diagnosis is made as to whether the cylinder deactivation control is functioning normally.

The present embodiment further provides the following advantages.

(1) In the present embodiment, the torque determination value TQeTh is set using the engine rotation speed NE and the intake air amount GA. This allows the torque determination value TQeTh to correspond to the friction torque of the internal combustion engine 10 at the moment. Using such a torque determination value TQeTh for the above-described diagnosis increases the diagnosis accuracy.

(2) In the present embodiment, when the second air-fuel ratio Afd has a richer value than the stoichiometric air-fuel ratio, the cylinder deactivation control is executed. In this case, when the cylinder deactivation control is not functioning normally, the three-way catalyst 22 may not be able to be supplied with a sufficient amount of oxygen. Accordingly, in the present embodiment, diagnosing whether the cylinder deactivation control is functioning normally allows for a determination as to whether the three-way catalyst 22 is supplied with a sufficient amount of oxygen.

The above-described embodiment may be modified as follows. The above-described embodiment and the following modifications can be combined as long as the combined modifications remain technically consistent with each other.

There may be two cylinders in which combustion is suspended by executing the cylinder deactivation control.

When it is determined that the second air-fuel ratio Afd does not have a richer value than the stoichiometric air-fuel ratio, the cylinder deactivation control may be executed. In such a case, in the cylinder deactivation control, the supply of fuel into the deactivated cylinder does not have to be suspended. This is because the combustion in the deactivated cylinder is able to be suspended only by suspending the running of the ignition device 19 corresponding to the deactivated cylinder.

As long as the torque determination value TQeTh is changed in correspondence with the intake air amount GA, the torque determination value TQeTh does not have to be changed in correspondence with the engine rotation speed NE.

As long as the torque determination value TQeTh is changed in correspondence with the engine rotation speed NE, the torque determination value TQeTh does not have to be changed in correspondence with the intake air amount GA.

The torque determination value TQeTh may be fixed at a specific value.

The vehicle in which the controller 100 is employed may be a hybrid vehicle having a configuration that differs from the configuration of the vehicle 500 as long as the hybrid vehicle includes an electric motor capable of inputting torque to the crankshaft 14.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid vehicle, the hybrid vehicle including an internal combustion engine with cylinders and a crankshaft and including an electric motor coupled to the crankshaft, the controller comprising processing circuitry configured to:

execute a cylinder deactivation control to control the internal combustion engine such that combustion is suspended in one or some of the cylinders while combustion is not suspended in the remaining ones of the cylinders;

control the electric motor such that a motor torque is input to the crankshaft in order to compensate for a decrease in an output torque of the internal combustion engine when the cylinder deactivation control is executed, the motor torque being torque of the electric motor, the decrease resulting from the suspension of the combustion in the one or some of the cylinders;

calculate an engine torque calculated value using an engine rotation speed, a motor rotation speed, and the motor torque, the engine torque calculated value being a calculated value of the output torque of the internal combustion engine, the engine rotation speed being a rotation speed of the crankshaft, the motor rotation speed being a rotation speed of the electric motor;

diagnose that the cylinder deactivation control is functioning normally when the engine torque calculated value is less than a torque determination value during the execution of the cylinder deactivation control; and diagnose that the cylinder deactivation control is not functioning normally when the engine torque calculated value is not less than the torque determination value during the execution of the cylinder deactivation control.

2. The controller according to claim 1, wherein the processing circuitry is configured to set the torque determination value in correspondence with at least one of an intake air amount of the internal combustion engine and the engine rotation speed.

3. The controller according to claim 1, wherein
the internal combustion engine includes:
a catalyst arranged in an exhaust passage; and
an air-fuel ratio sensor arranged downstream of the catalyst in the exhaust passage,
the processing circuitry is configured to execute the cylinder deactivation control when an air-fuel ratio detected by the air-fuel ratio sensor indicates a richer value than a stoichiometric air-fuel ratio, and
the cylinder deactivation control includes suspending supply of fuel into the one or some of the cylinders.

4. A control method for a hybrid vehicle, the hybrid vehicle including an internal combustion engine with cylinders and a crankshaft and including an electric motor coupled to the crankshaft, the control method comprising:

executing a cylinder deactivation control to control the internal combustion engine such that combustion is suspended in one or some of the cylinders while combustion is not suspended in the remaining ones of the cylinders;

controlling the electric motor such that a motor torque is input to the crankshaft in order to compensate for a decrease in an output torque of the internal combustion engine when the cylinder deactivation control is executed, the motor torque being torque of the electric motor, the decrease resulting from the suspension of the combustion in the one or some of the cylinders;

calculating an engine torque calculated value using an engine rotation speed, a motor rotation speed, and the motor torque, the engine torque calculated value being a calculated value of the output torque of the internal combustion engine, the engine rotation speed being a rotation speed of the crankshaft, the motor rotation speed being a rotation speed of the electric motor;

diagnosing that the cylinder deactivation control is functioning normally when the engine torque calculated value is less than a torque determination value during the execution of the cylinder deactivation control; and diagnosing that the cylinder deactivation control is not functioning normally when the engine torque calculated value is not less than the torque determination value during the execution of the cylinder deactivation control.

\* \* \* \* \*